US009805550B2

(12) United States Patent
Masui

(10) Patent No.: US 9,805,550 B2
(45) Date of Patent: Oct. 31, 2017

(54) GAMING DEVICE, PROGRAM, SYSTEM, AND ARCADE GAMING DEVICE

(71) Applicant: KABUSHIKI KAISHA SEGA Games, Tokyo (JP)

(72) Inventor: Hiroshi Masui, Tokyo (JP)

(73) Assignee: KABUSHIKI KAISHA SEGA GAMES, Tokyo (JP)

( * ) Notice: Subject to any disclaimer, the term of this patent is extended or adjusted under 35 U.S.C. 154(b) by 158 days.

(21) Appl. No.: 14/767,049

(22) PCT Filed: Dec. 26, 2013

(86) PCT No.: PCT/JP2013/084977
§ 371 (c)(1),
(2) Date: Aug. 11, 2015

(87) PCT Pub. No.: WO2014/125750
PCT Pub. Date: Aug. 21, 2014

(65) Prior Publication Data
US 2015/0379817 A1  Dec. 31, 2015

(30) Foreign Application Priority Data
Feb. 14, 2013  (JP) .................. 2013-026945

(51) Int. Cl.
*G06F 17/00* (2006.01)
*G07F 17/32* (2006.01)
(Continued)

(52) U.S. Cl.
CPC .......... *G07F 17/3244* (2013.01); *A63F 13/45* (2014.09); *A63F 13/46* (2014.09);
(Continued)

(58) Field of Classification Search
USPC ...................................... 463/16–25
See application file for complete search history.

(56) References Cited

U.S. PATENT DOCUMENTS 9,573,051 B1* 2/2017 Curtis ............... A63F 13/10
2004/0254004 A1* 12/2004 Kojima ............. A63F 13/10
463/1
(Continued)

FOREIGN PATENT DOCUMENTS

JP  2004-227606  8/2004
JP  2005-000304  1/2005
(Continued)

OTHER PUBLICATIONS

Logres of Swords and Sorcery Koshiki site, [online], date of upload Mar. 30, 2012, http://mmo-logres.com/news/319- (2013), 9 pages.
(Continued)

*Primary Examiner* — Ronald Laneau
(74) *Attorney, Agent, or Firm* — Finnegan, Henderson, Farabow, Garrett & Dunner, LLP

(57) ABSTRACT

In order to improve the tempo of a game, a gaming device 100 has permission means (308) for, when execution means (306) starts to execute a game action in a game, permitting the execution by subtracting a consumption value according to the game action from an execution acceptable value for the game action, temporal recovery means (318) for allowing for recovery of the execution acceptable value resulting from the subtraction, as time passes using a recovery upper limit value as an upper limit, and payment recovery means (320) for allowing for recovery of the execution acceptable value resulting from the subtraction, based on payment or use of a game item obtained by the payment, even when the recovery upper limit value is exceeded.

10 Claims, 14 Drawing Sheets

(51) Int. Cl.
  *A63F 13/46* (2014.01)
  *A63F 13/792* (2014.01)
  *A63F 13/45* (2014.01)
  *A63F 13/58* (2014.01)

(52) U.S. Cl.
  CPC ............ *A63F 13/792* (2014.09); *G07F 17/32* (2013.01); *G07F 17/3286* (2013.01); *A63F 13/58* (2014.09)

(56) References Cited

U.S. PATENT DOCUMENTS

| | | | | |
|---|---|---|---|---|
| 2010/0311494 | A1* | 12/2010 | Miller | ........................ A63F 1/18 463/22 |
| 2014/0073416 | A1 | 3/2014 | Toyama | |
| 2016/0171835 | A1* | 6/2016 | Washington | ........ G07F 17/3244 463/25 |

FOREIGN PATENT DOCUMENTS

| | | |
|---|---|---|
| JP | 2011-125563 | 6/2011 |
| JP | 2012-061114 | 3/2012 |
| JP | 2012-176138 | 9/2012 |
| JP | 2012-235871 | 12/2012 |
| JP | 2013-198543 | 10/2013 |

OTHER PUBLICATIONS

International Search Report from the Japanese Patent Office for International Application No. PCT/JP2013/084977 dated Apr. 8, 2014.

Office Action in Japanese Application No. 2017-060649, dated Apr. 12, 2017 and English translation thereof.

"About the Magic of 'Happy Vegeful,' Vegetarian Diary of Taisa", NHN Hangame Corp., Feb. 24, 2012, retrieved on Apr. 5, 2017, from http://blog.hangame.co.jp/T049604432/article/37748572.

"[Monoria] Co-sponsored event is taking place! In addition, new magic has been added!" Happy Vegeful, NHN Hangame Corp., Jul. 7, 2011, retrieved on Apr. 5, 2017, from http://casual.hangame.co.jp/notice4.nhn?m  =read&view=&bbsid=910&bbstype=notice&gameid=O_PWZ_NOTICE&page=1&docid=1652611.

"[Happy Vegeful] 'Let's catch a Happy Fairy!,'" Happy Vegeful, NHN Hangame Corp., Jul. 19, 2012, retrieved on Apr. 5, 2017, from http://casual.hangame.co.jp/notice4.nhn?m=read&view=&bbsid=910&bbstype=notice&gameid=O_PWZ_NOTICE&page=1&docid=2820248.

"[Happy Vegeful] Information about this week's update," Happy Vegeful, NHN Hangame Corp., Dec. 13, 2012, retrieved on Apr. 5, 2017, from http://casual.hangame.co.jp/notice4.nhn?m=read&gameid=O_PWZ_NOTICE&docid=3552992.

"[Pokemon] Manipulation of effort values (doping)," Wi-Fi blog: Diary about Conquest Play of Pocket Monster (Pokemon) Platinum, Dec. 10, 2006, retrieved on Apr. 5, 2017, from http://jjan.blog68.fc2.com/blog-entry-199.htm.

* cited by examiner

GAMING DEVICE, PROGRAM, SYSTEM, AND ARCADE GAMING DEVICE

CROSS-REFERENCE TO RELATED APPLICATIONS

This application is a national phase application based on international application number PCT/JP2013/084977, filed Dec. 26, 2013, which claims the priority of Japanese Patent Application No. JP2013-026945, filed Feb. 14, 2013, the content of each application being incorporated herein by reference.

BACKGROUND

The present invention relates to a gaming device, a program, a system, and an arcade gaming device.

Recently, what is called an arcade gaming device provided in an amusement facility or the like has been used to allow a plurality of players to play the same game. Furthermore, what is called online games have been available in which a game program is downloaded into mobile terminals such as smartphones so that a game progress process is executed on a server, while the results of the process are reflected in each mobile terminal.

In some of these games, a certain cost (for example, "stamina") is consumed in order to perform a game action (for example, a "quest") in the game, and recovery of the consumed stamina is performed as time passes.

In such a game, loss of stamina precludes the game from being continued. Thus, in order to continue the game, the players of the game choose to wait a certain time for the stamina to be recovered or to pay to acquire a recovery item to immediately recover the stamina (for example, Patent Literature 1 and Non-patent Literature 1).

Patent Literature 1: Patent Publication JP-A-2012-235871

Non-patent Literature 1: author unknown, "Imasara kikenai 'pazuru & doragonzu' no miryoku (The charm of now ubiquitous 'Puzzle and Dragons')", [online], Nov. 30, 2012, Dengeki Online, [retrieved on Jan. 25, 2013], Internet <URL: http://news.dengeki.com/elem/000/000/564/564405/>

SUMMARY

At present, when the recovery item acquired by payment is used, a situation frequently occurs where an odd amount of stamina remains. For example, in a game where the stamina has a maximum value of "100" and where "30" stamina is consumed to execute a quest, when the current stamina is "28", the use of the recovery item causes recovery from the "28" stamina to full, "100"stamina. The stamina resulting from the use of the recovery item is "100" regardless of whether the current stamina is "0" or "28". Consequently, when the stamina is "28", the player feels that the "28" stamina the player originally had has been lost. Thus, the player generally acts to wait for recovery from the "28" stamina to "30" stamina and go on a quest that consumes "30" stamina and then to use the recovery item.

Furthermore, in a game where "30" stamina is consumed to execute a quest that provides a relatively large reward and "10" stamina is consumed to execute a quest that provides a relatively small reward, when the current stamina is "21", the player, in order to avoid losing all of the "21" stamina, generally acts to reluctantly go on two quests each consuming "10" stamina for the purpose of earning the reward and then use the recovery item.

However, a wait time for which the player waits for the stamina to recover during the game, disadvantageously degrading the tempo of the game.

Thus, an object of the present invention is to provide a gaming device, a program, a system, and an arcade gaming device which improve the tempo of the game.

The present inventors made various examinations in order to solve the above-described problem. To improve the tempo of the game, the number of opportunities to pay to acquire the recovery item may be increased. For example, when the game is an arcade game, the arcade gaming device is occupied during the wait time and a game turnover ratio decreases, resulting in loss of opportunities for payment. Furthermore, when the game is a network game, players often utilize the game in order to fill up the time and thus shift to another game during the wait time. This also leads to loss of opportunities for payment.

Thus, the present inventors considered that, in order to increase the number of opportunities for payment, the stamina the payer originally has may be prevented from being lost even when the player uses the recovery item as described above. Through further examinations based on such a perspective, the present inventors have obtained knowledge based on which the problem may be solved.

The present invention is based on the knowledge and is a gaming device including:

execution means for executing a game action in a game;

storage means for storing an execution acceptable value for the game action;

permission means for, when the execution means starts to execute the game action, permitting the execution by subtracting a consumption value according to the game action from the execution acceptable value;

temporal recovery means for allowing for recovery of the execution acceptable value resulting from the subtraction by the permission means, as time passes using a recovery upper limit value as an upper limit; and payment recovery means for allowing for recovery of the execution acceptable value resulting from the subtraction by the permission means, based on payment or use of a game item obtained by the payment, even when the recovery upper limit value is exceeded.

This configuration allows the execution acceptable value, for example, stamina to be recovered based on the payment or the use of the game item even when the recovery upper limit value is exceeded. Thus, even when an odd execution acceptable value that is insufficient to perform a game action remains, the excess execution acceptable value is included in the recovered execution acceptable value, preventing a player from making a loss. Furthermore, the temporal recovery means fails to achieve the recovery when the recovery upper limit value is exceeded, whereby the player has a stronger sense of the payment or the use of the game item. Thus, the player actively pays or uses the game item, allowing the tempo of the game to be improved.

Additionally, in the gaming device, preferably, the storage means stores a maximum value of the execution acceptable value that is larger than the recovery upper limit value, and the payment recovery means inhibits the payment or the use when the recovery upper limit value is exceeded.

If the payment recovery means simply performs the recovery even when the recovery upper limit value is exceeded, the following situation may occur. That is, although depending on the degree of the recovery performed by the payment recovery means, when the execution acceptable value exceeds the recovery upper limit value and recovery of the execution acceptable value is performed based on the payment or the use of the game item, the execution acceptable value reaches the maximum value before the recovery is complete. Thus, the execution acceptable value the player originally has is lost. Therefore, this preferred configuration inhibits the payment or the use of the game item when the execution acceptable value exceeds the recovery upper limit value. This prevents the execution acceptable value from reaching the maximum value before the recovery is complete, allowing the execution acceptable value the player originally has to be prevented from being lost.

Furthermore, in the gaming device, the payment recovery means preferably allows for recovery of the execution acceptable value resulting from the subtraction by the permission means, by a value equal to or smaller than a difference between the maximum value and the recovery upper limit value.

If the payment recovery means simply performs the recovery even when the recovery upper limit value is exceeded, the following situation may occur. That is, if the degree of the recovery performed by the payment recovery means is high, when a value resulting from subtraction of the execution acceptable value from the maximum value is smaller than the degree of the recovery even though the execution acceptable value does not exceed the recovery upper limit value, the execution acceptable value reaches the maximum value before the recovery is complete. Thus, a part (the difference between the degree of the recovery and the value resulting from the subtraction) of the execution acceptable value the player originally has is lost. Therefore, in this preferred configuration, the payment or the use of the game item allows for recovery of the execution acceptable value by the value equal to or smaller than the difference between the maximum value of the execution acceptable value and the recovery upper limit value based on, whereby when the execution acceptable value does not exceed the recovery upper limit value, the value resulting from subtraction of the execution acceptable value from the maximum value is prevented from being smaller than the degree of the recovery and the recovery is positively achieved by the value resulting from subtraction of the execution acceptable value from the maximum value before the maximum value is reached. Therefore, a part of the execution acceptable value that the player originally has can be prevented from being lost.

Furthermore, preferably, the gaming device further has display means for representing the execution acceptable value with a bar, and the display means displays a background of the bar display in a color similar to a color of the bar when the execution acceptable value exceeds the recovery upper limit value, and displays the background of the bar display in a color different from the color of the bar when the execution acceptable value is equal to or smaller than the recovery upper limit value.

In this configuration, when the execution acceptable value exceeds the recovery upper limit value, the player is able to know that, for example, the payment or the use of the game item is inhibited because the background of the bar display is similar in color to the bar. Furthermore, when the execution acceptable value is equal to or smaller than the recovery upper limit value, the player is able to know that, for example, the payment or the use of the game item is allowed because the background of the bar display is different in color from the bar.

Additionally, in the gaming device, preferably, the display means displays a maximum value in the bar display as a value indicated by the recovery upper limit value when the execution acceptable value is equal to or smaller than the recovery upper limit value.

In this configuration, even if the execution acceptable value does not reach the maximum value, when the full recovery is achieved by means of the temporal recovery, the player may apparently feel that the full execution acceptable value has been recovered. Thus, the player may gain a sense of satisfaction based on the temporal recovery.

Furthermore, in the gaming device, the display means preferably displays a maximum value in the bar display as a value indicated by the execution acceptable value when the execution acceptable value exceeds the recovery upper limit value.

In this configuration, based on the payment or the use of the game item, even when the execution acceptable value has not reached the maximum value, the bar in the bar display reaches the maximum value in the bar display. Thus, the player may apparently feel that the full execution acceptable value has been recovered. Consequently, the player may have a stronger sense of the payment or the use of the game item.

Furthermore, in the gaming device, the display means preferably provides a display that urges the payment when the execution acceptable value is smaller than the value according to the game action which is subtracted by the permission means.

In this preferred configuration, the display that urges the payment is presented to the player, allowing the player to volitionally pay while avoiding waiting for the temporal recovery.

Additionally, the gaming device is preferably an arcade game apparatus including operation means for operating the game and reception means for receiving the payment.

In this preferred embodiment, even when an odd execution acceptable value that is insufficient to perform a game action remains, the player actively pays. Thus, the arcade game apparatus is less frequently occupied during the wait time, allowing a possible decrease in game turnover ratio to be suppressed.

Furthermore, the present invention is a program allowing a computer to execute:

an execution step of executing a game action in a game;

a permission step of, when the execution of the game action in the execution step is started, permitting the execution by subtracting a value according to the game action from an execution acceptable value for the game action;

a temporal recovery step of allowing for recovery of the execution acceptable value resulting from the subtraction in the permission step, as time passes using a recovery upper limit value as an upper limit; and a payment recovery step of allowing for recovery of the execution acceptable value resulting from the subtraction in the permission step, based on payment or use of a game item obtained by the payment, even when the recovery upper limit value is exceeded.

The steps also allow the tempo of the game to be improved as described above.

Additionally, the present invention is a system including:

execution means for executing a game action in a game;

storage means for storing an execution acceptable value for the game action;

permission means for, when the execution means starts to execute the game action, permitting the execution by subtracting a consumption value according to the game action from the execution acceptable value;

temporal recovery means for allowing for recovery of the execution acceptable value resulting from the subtraction by the permission means, as time passes using a recovery upper limit value as an upper limit; and payment recovery means for allowing for recovery of the execution acceptable value resulting from the subtraction by the permission means, based on payment or use of a game item obtained by the payment, even when the recovery upper limit value is exceeded.

This configuration also allows the tempo of the game to be improved as described above.

Furthermore, the present invention is an arcade gaming device installed in a gaming facility, the arcade gaming device including:

operation means for operating a game in accordance with a player's operation;

reception means for receiving payment;

game start means for starting the game in accordance with operation of the operation means without the payment;

execution means for executing a game action in a game in accordance with the operation of the operation means;

storage means for storing an execution acceptable value for the game action;

permission means for, when the execution means starts to execute the game action, permitting the execution by subtracting a consumption value according to the game action from the execution acceptable value without the payment when the execution acceptable value is equal to or larger than the consumption value;

temporal recovery means for allowing for recovery of the execution acceptable value, as time passes using a recovery upper limit value as an upper limit; and payment recovery means for allowing for recovery of the execution acceptable value based on payment or use of a game item obtained by the payment, even when the recovery upper limit value is exceeded.

This configuration also allows the tempo of the game to be improved as described above. Furthermore, the configuration enables the game to be started without the payment, and allows the game action to be performed without the payment when the execution acceptable value is equal to or larger than the consumption value according to the game action. This precludes the payment from being efficiently received when only the temporal recovery is used. Thus, the execution acceptable value is recovered based on the payment or the use of the game item obtained by the payment even when the recovery upper limit value is exceeded. Consequently, the arcade gaming device is less frequently occupied during the wait time otherwise needed to achieve recovery from an odd amount of stamina, allowing a possible decrease in game turnover ratio to be suppressed. As a result, the payment can be efficiently received.

The present invention allows the tempo of the game to be improved.

DETAILED DESCRIPTION

Figure 1:
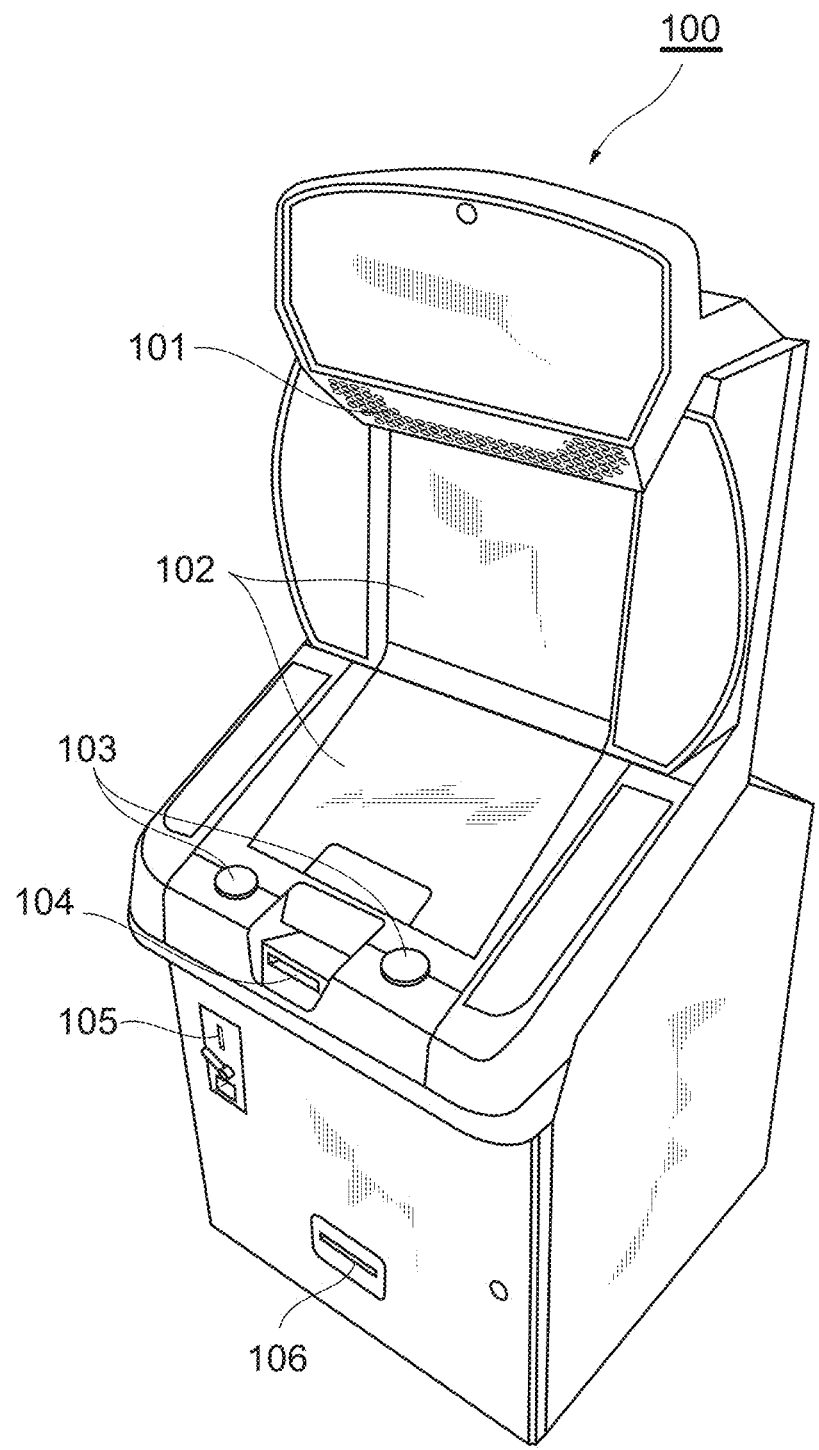
FIG. 1 is a front perspective view of the appearance of a gaming device according to a first embodiment.

Embodiments of the present invention will be described below with reference to the drawings. However, the embodiments described below are only illustrative and are not intended to exclude other variations and applications of techniques not explicitly described below. That is, variations (combinations of the embodiments and the like) may be made to the present invention as long as they do not depart from the spirit of the invention. Furthermore, in the description of the drawings, identical or similar components are denoted by identical or similar reference numerals. The drawings are schematic and are not necessarily to scale. The drawings may be partly different from one other in dimensional relation or ratio.

<First Embodiment>

A gaming device and a program according to a first embodiment will be described below using the drawings. FIG. 1 is a front perspective view of the appearance of the gaming device according to the first embodiment.

A gaming device 100 illustrated in FIG. 1 is, for example, a type of what is called an arcade gaming device provided in amusement facilities located throughout Japan. The gaming device 100 is, for example, a gaming device used to play a new puzzle role playing game in which quests incorporating a dropping puzzle game (in the embodiments, a game referred to as "Puyo Puyo(registered trademark)") in battles between a player of the gaming device 100 and enemies are cleared.

Unlike arcade gaming devices normally provided in amusement facilities, the gaming device 100 allows a player to play the game for free without the need to insert coins into the apparatus as long as stamina described below remains. The gaming device 100 is an arcade gaming device 100 that adopts a business model referred to as free-to-play (F2P) and charging no price for basic plays. Furthermore, by inserting coins into the apparatus, players can gain credit in accordance with the inserted coins. The players can purchase a game item or the like described below by using the credit.

[Configuration Example of the Gaming Device]

First, a configuration example of the gaming device 100 will be described below.

The gaming device 100 includes a speaker 101, two displays 102, two operation buttons (hereinafter referred to as "operation input apparatuses" 103), a card reading apparatus 104, a coin inserting apparatus 105, and a card issuance apparatus 106. The speaker 101 outputs voice guidance, sound effects, and the like for the game. The displays 102 are two vertically arranged displays and display images (for example, still images, moving images, and videos) that express or render the game. The operation input apparatus 103 includes two laterally arranged buttons configured to input a player's instructions to the gaming device. The card reading apparatus 104 reads information from a card owned by the player. The coin inserting apparatus 105 receives coins or medals which are inserted by the player as consideration for game play. The card issuance apparatus 106 issues and returns a card to the player.

The card has an ID that can be identified by the gaming device 100. In the present embodiment, a bar code indicating a unique ID is printed on each paper card, and the card is stored in the card issuance apparatus 106 of the gaming device 100. This enables a reduction in the unit price of a card and also enables the card to be issued after each game. Furthermore, in the present embodiment, the ID corresponding to the bar code printed on the card is used as identification information.

Figure 2:
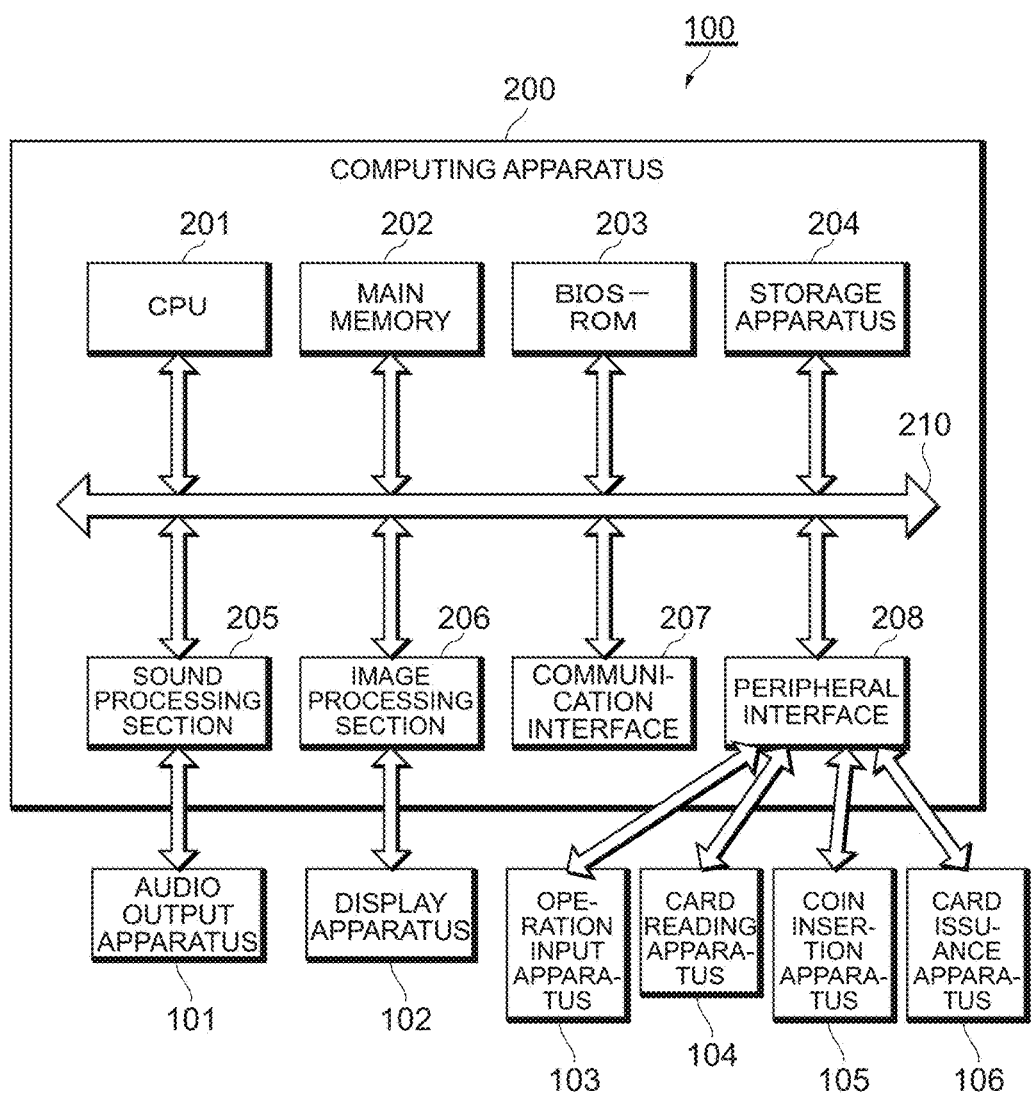
FIG. 2 is a schematic block diagram of a hardware configuration of the gaming device according to the first embodiment.

With reference to FIG. 2, a hardware configuration of the gaming device 100 will be described. As depicted in FIG. 2 the gaming device 100 includes, by way of example, a computing apparatus 200, an audio output apparatus 101, the display apparatus 102, the operation input apparatus 103, the card reading apparatus 104, the coin inserting apparatus 105, and the card issuance apparatus 106.

The computing apparatus 200 integrally controls the gaming device 100. The computing apparatus 200 is, for example, a computer circuit element including a chip set with various processors and memories. The computing apparatus 200 in the present embodiment includes, by way of example, a CPU 201, a main memory 202, a BIOS-ROM 203, a storage apparatus 204, a sound processing section 205, an image processing section 206, a communication interface 207, a peripheral interface 208, and a system bus 210 that connects these components together.

The CPU 201, for example, executes a game program deployed on the main memory 202 to allow the computing apparatus 200 to implement various functions. In other words, the computing apparatus 200 executes the game program under the control of the CPU 201 to implement the game in corporation with other pieces of hardware.

The storage apparatus 204 stores programs and various data. The sound processing section 205 executes various sound processes under the control of the CPU 201. The image processing section 206 executes various graphics processes under the control of the CPU 201. The communication interface 207 is an interface that enables communication with a server and other gaming devices. The peripheral interface 208 is an interface that enables communication with peripheral apparatuses such as the operation input apparatus 103, the card reading apparatus 104, the coin inserting apparatus 105, and the card issuance apparatus 106.

[Example of Content of the Game]

Now, an example of content of a game provided to a user by the gaming device 100 of the present embodiment wall be described. The game is implemented by the gaming device 100 executing the game program under the control of the CPU 201.

First, to start the game, the player inserts the players card into the card reading apparatus 104 of the gaming device 100, and inserts coins into the coin inserting apparatus 105. Inserting the coins into the coin inserting apparatus 105 allows the player to own, in the game, credit corresponding to the amount of the coins.

The gaming device 100 allows the display apparatus 102 to display a story selection screen according to the ID of the read card.

Figure 3:
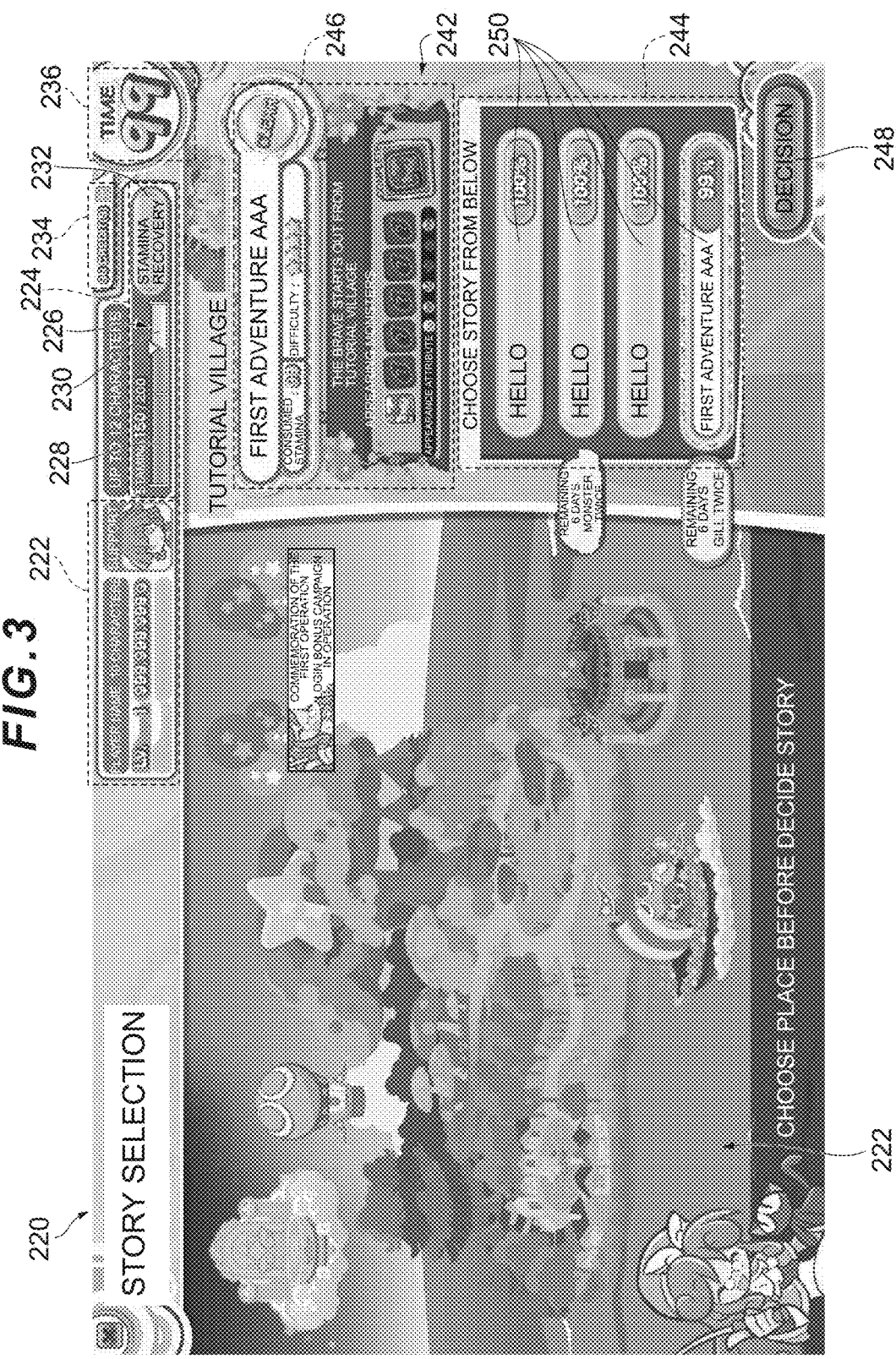
FIG. 3 is a schematic diagram illustrating a story selection screen displayed on a display apparatus.

FIG. 3 is a schematic diagram tin a story selection screen 220 displayed on the display apparatus 102.

At an upper end of center of the story selection screen 220, a player information display section 222 is provided which depicts, for example, the name and level of the player based on the ID of the read card, funds in the game, and the like. In the story selection screen 220, for example, a stamina display screen 224 is provided next to the player information display section 222 on the right.

The stamina display screen 224 is provided with, for example, a bar display section 226 representing stamina corresponding to an execution acceptable value according to the present embodiment, with a bar. The bar display section 226 is provided with a bar 228 indicating the value of the current stamina and a frame 230 for the bar 228.

The stamina will be described below in detail. The stamina is consumed each time a quest in the story is executed and can be recovered as time passes and using the credit. When the stamina is consumed to "0", the game is ended. Furthermore, in the present embodiment, the stamina is set to have a maximum value of, for example, "200". In the stamina display screen 224, for example, a stamina recovery button 232 is provided next to the bar display section 226 on the right. The stamina recovery button 232 will be described below in detail. In response to depressing of the stamina recovery button 232, the player's credit is used to recover the stamina.

In the story selection screen 220, a credit balance section 234 indicating the balance of the player's credit acquired by paying coins is provided in the upper right of the stamina display screen 224.

Furthermore, in the story selection screen 220, a time display section 236 indicating time based on subtraction of the progress time of the game provided next to the stamina display screen 224 on the right.

The story selection screen 220 is provided with a map area 240 extending from a central portion to a left end of the screen. The map area 240 allows the player to select a desired place to play in the game by inputting via the operation input apparatus 103.

In the story selection screen 220, a place detail display section 242 displaying the details of the place selected by the player is provided next to the map area 240 on the right. The place detail display section 242 is provided with, for example, a story selection section 244, a story detail display section 246, and a decision button 248.

The story selection section 244 is provided with a plurality of story selection buttons 250 used to select one of a plurality of stories in the selected place. When the player selects (depresses) one of the story selection buttons 250 using the operation input apparatus 103, the selected story selection button 250 is activated (for example, brightened).

Then, the details of the story corresponding to the selected story selection button 250 are reflected in the story detail display section 246.

The story detail display section 246 displays the name of the story, the difficulty involved in the story, the amount of stamina consumed by execution of the story (hereinafter referred to as the "consumed stamina"), monsters appearing in the story, and the like. The consumed stamina varies in value depending on the type of a quest and is set so as to increase consistently with the difficulty (for example, the consumed stamina is 30 when the difficulty is 3 and is 40 when the difficulty is 4).

The decision button 248 is a button used to start a story corresponding to the story selection button 250 selected in response to the users depression using the operation input apparatus 103. When the story is started by the depression of the decision button 248, a quest in the story is executed by consuming the consumed stamina from the current stamina. The quest, the details of which are omitted, incorporates the dropping puzzle game (Puyo Puyo) in battles between the player and enemies (monsters) as described above.

[Example of a Functional Configuration of the Gaming Device 100]

Figure 4:
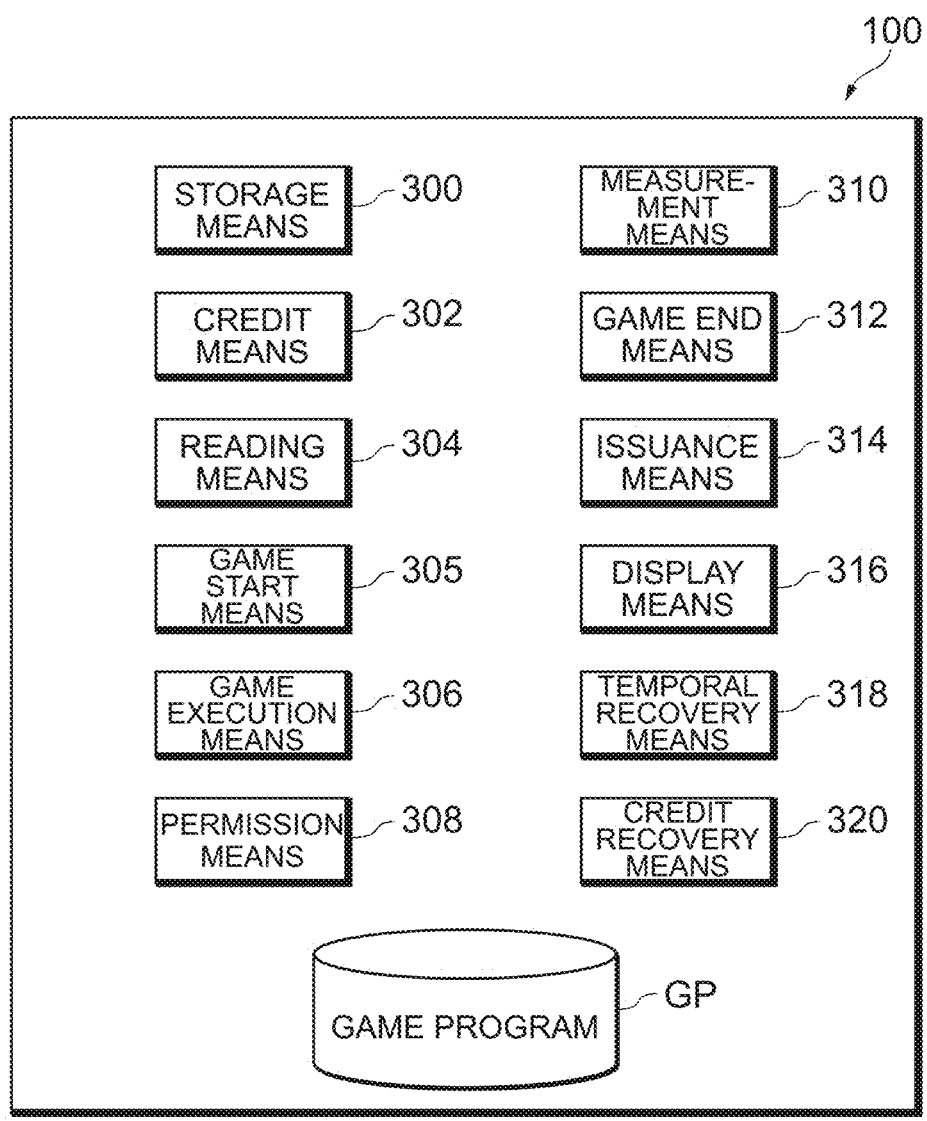
FIG. 4 is a functional block diagram depicting a functional configuration of the gaming device of the first embodiment.

Now, a functional configuration of the gaming device 100 of the embodiment will be described. FIG. 4 is a functional block diagram representing the functional configuration of the gaming device 100 of the first embodiment with blocks.

The gaming device 100 has, for example, storage means 300, credit means 302, reading means 304, game start means 305, game execution means 306, permission means 308, measurement means 310, game end means 312, and issuance means 314. Furthermore, in the present embodiment, the gaming device 100 has display means 316, temporal recovery means 318, and credit recovery means 320.

The storage means 300 includes, for example, the storage apparatus 204, the CPU 201, the main memory 202, and a game program GP. The storage means 300 stores player identification information, credit balance, the current stamina, the maximum value of the stamina, and game progress situation information in association with one another. The player identification information is ID information that uniquely identifies the player. In the present embodiment, the ID corresponding to the bar code printed on the card is used as the player identification information. The credit balance is the credit remaining at the end of the last game. The game progress situation information is information on a point of arrival in the game at the end of the last game, for example, information on the progress situation of the game, for example, the information related to which quests have been cleared. Furthermore, when the card is located in the card reading apparatus 104 at the end of the game, the storage means 300 updates the credit balance and game progress situation information recorded in the storage apparatus 204 in association with the ID of the card.

The credit means 302 includes the CPU 201, the main memory 202, and the game program GP. The credit means 302 detects the coins inserted through the coin inserting apparatus 105, converts the coins into credit according to the amount of the coins, and adds the resultant credit to the credit stored in the storage means 300.

The reading means 304 includes, for example, the card reading apparatus 104, the CPU 201 the main memory 202, and the game program GP. The reading means 304 reads the player identification information from the card inserted into the card reading apparatus 104.

The game start means 305 includes, for example, the CPU 201, the main memory 202, and the game program GP. The game start means 305 switches the display on the display apparatus 102 from a standby screen (advertise screen) to a game screen to start the game in response to acquisition of the player identification information by the reading means 304 or in response to acquisition of information on the player's operation of the operation input apparatus 103.

The game execution means 306 includes, for example, the CPU 201, the main memory 202, and the game program GP. The game execution means 306 executes a quest corresponding to a game action according to the present embodiment, for example, in response to acquisition of a notification of permission from the permission means 308. Conventional arcade gaming devices need insertion of predetermined coins to start a game or to perform a game action. However, the gaming device 100 of the present embodiment enables the game to be started without the need to insert coins, and also allows a quest as a game action to be executed without the need to insert coins as long as the current stamina is equal to or more than the consumed stamina according to the quest.

The permission means 308 includes, for example, the CPU 201, the main memory 202, and the game program GP. When the game execution means 306 starts execution, immediately before execution of a quest in the story for which the decision button 248 depicted in FIG. 3 has been depressed, the permission means 308 subtracts the consumed stamina according to the quest from the current stamina stored in the storage means 300 to provide a notification of permission to the game execution means 306, thus permitting the quest to be executed.

Figure 5:
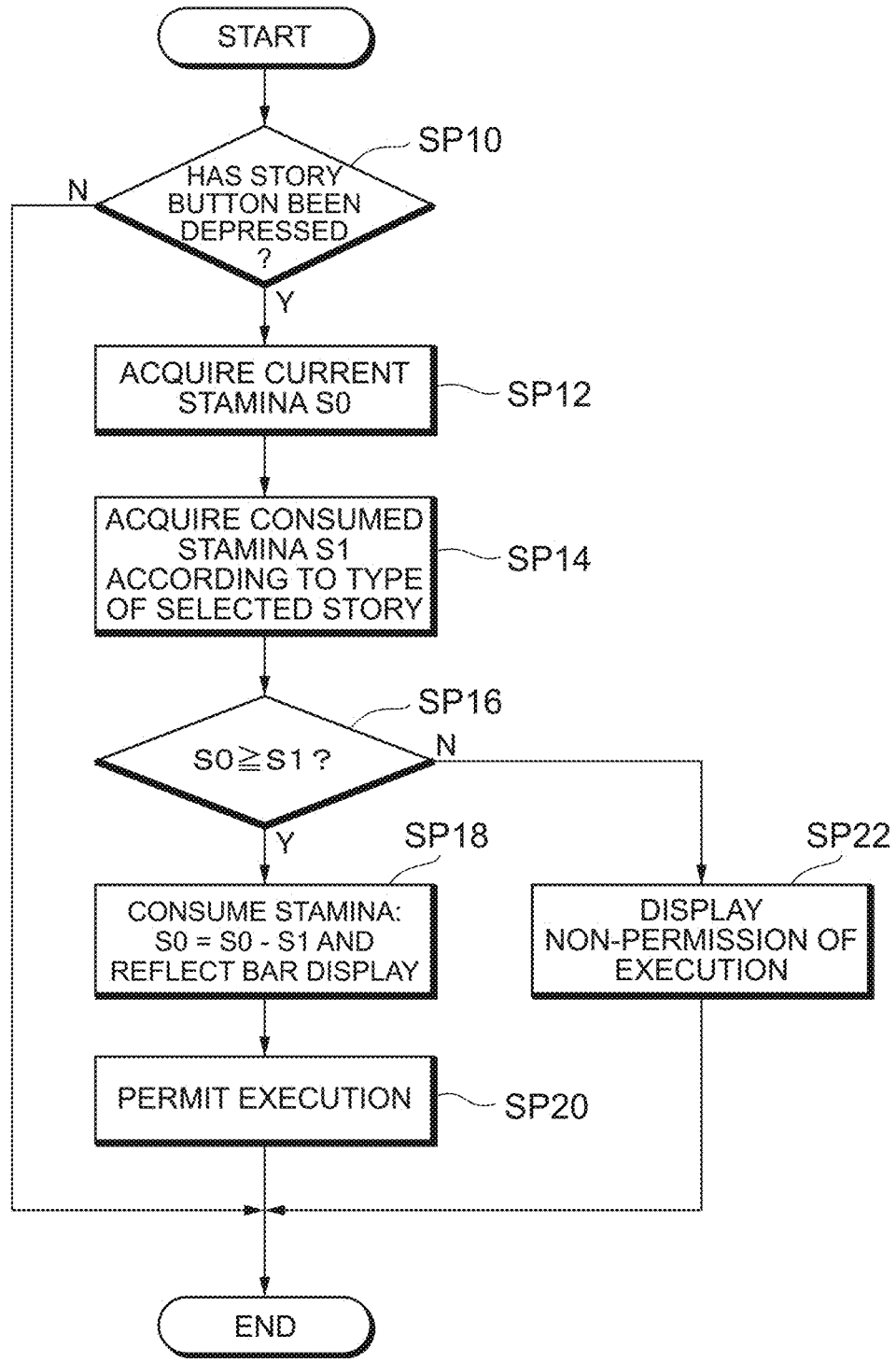
FIG. 5 is a flowchart depicting a flow of processing by permission means according to the first embodiment.

Specifically, the permission means 308 executes such processing as depicted in FIG. 5. FIG. 5 is a flowchart depicting a flow of processing by the permission means 308. The processing in the flowchart is repeated every second in the story selection screen 220 depicted in FIG. 3. Identification numerals in parentheses described below correspond to step identification numerals in FIG. 5.

(SP10) The permission means 308 determines whether or not the decision button 248 depicted in FIG. 3 has been depressed. The permission means 308 shifts to processing in step SP12 upon making an affirmative determination and ends the entire process upon making a negative determination.

(SP12) The permission means 308 acquires current stamina S0 from the storage means 300. Then, the permission means 308 shifts to processing in step SP14.

(SP14) The permission means 308 acquires consumed stamina S1 according to the type of the story selected by the player. The permission means 308 then shifts to processing in step SP16.

(SP16) The permission means 308 determines whether or not the current stamina S0 is equal to or more than the consumed stamina S1 (S0≥S1). The permission means 308 shifts to processing in step SP18 upon making an affirmative determination and to processing in step SP22 upon determining a negative determination.

(SP18) The permission means 308 performs stamina consumption. Specifically, the permission means 308 subtracts the consumed stamina S1 from the current stamina S0 (S0=S0−S1). The permission means 308 then stores the stamina S0 resulting from the subtraction in the storage means 300 as the current stamina S0. Thus, the display means 316 reflects the result of the subtraction in the bar 228 for the current stamina depicted in FIG. 3. The permission means 308 then shifts to processing in step SP20.

(SP20) The permission means 308 provides a notification of permission to the game execution means 306 without the need for the player to insert coins. Thus, the game execution means 306 enables a quest to be executed. Then, the permission means 308 ends the entire process.

(SP22) The permission means 308 allows the display means 316 to indicate, on the story selection screen 220, that executing the quest is impossible. Moreover, a display that urges payment such as "Insert coins" or "Use credit" is presented Then, the permission means 308 ends the entire process.

With reference back to FIG. 4, the measurement means 310 will be described. The measurement means 310 includes, for example, the CPU 201, the main memory 202, and the game program GP and measures the progress time of the game. The measured value is reflected, as needed, in the time display section 236 depicted in FIG. 3.

The game end means 312 includes, for example, the CPU 201, the main memory 202, and the game program GP. The game end means 312 ends the game when the player, desiring to end the game at a predetermined timing, selects a game end button or the like. The predetermined timing is a timing when the game end button is selected on a map screen or when "Not continue" is selected on a continue screen displayed when completing the story fails or when "Not continue game" is selected on a result screen displaced after the story is completed.

The issuance means 314 includes, for example, the card reading apparatus 104, the CPU 201, the main memory 202, and the game program GP. When no card is inserted into the card reading apparatus 104 before the game is started, the issuance means 314 issues a card when the game is over.

The display means 316 includes, for example, the display apparatus 102, the CPU 201, the main memory 202, and the game program. The display means 316, for example, controls display of the story selection screen 220 and the bar 228 for stamina depicted in FIG. 3. Furthermore, the display means 316, in addition to presenting the display that urges payment, for example, displays the background of the bar display section 226 in a color similar to the color of the bar 228 when the current stamina S0 exceeds a preset recovery upper limit value (which is smaller than the maximum value of the stamina) for the temporal recovery means 318, and displays the background of the bar display section 226 in a color different from the color of the bar 228 when the current stamina S0 is equal to or less than recovery upper limit value (for example, "100"). In a specific example, for example, the display means 316 sets the color of the frame 230 of the bar and the color inside the frame 320 to be the same color as that of the bar 228, that is, blue, when the stamina exceeds the recovery upper limit value, and sets the color of the frame 230 of the bar and the color inside the frame 320 to a color different from the color (blue) of the bar 228, that is, red, when the current stamina is equal to or less than the recovery upper limit value.

The temporal recovery means 318 includes, for example, the CPU 201, the main memory 202, and the game program. The temporal recovery means 318 allows for recovery from the current stamina S0 resulting from the subtraction by the permission means 308, as time passes using the recovery upper limit value as an upper limit. Although the degree and the time intervals of the temporal recovery are not particularly limited, the temporal recovery means 318 can be set to increment recovery from the stamina S0 by "1" every three minutes. When the current stamina S0 reaches the recovery upper limit value, the temporal recovery is no longer performed.

Figure 6:
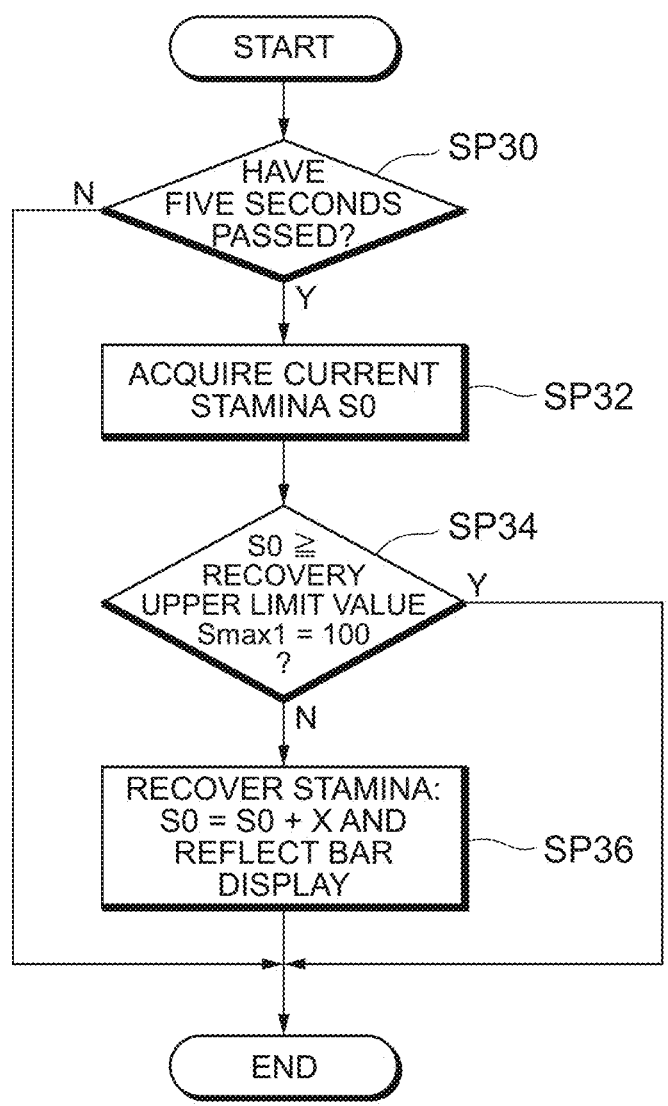
FIG. 6 is a flowchart depicting a flow of processing by temporal recovery means according to the first embodiment.

Specifically, the temporal recovery means 318 executes such processing as depicted in FIG. 6. FIG. 6 is a flowchart depicting a flow of processing executed by the temporal recovery means 318 when recovery from the stamina S0 is incremented by "X" every five seconds. The processing in the flowchart is repeated every second in the story selection screen 220 depicted in FIG. 3. Identification numerals in parentheses described below correspond to step identification numerals in FIG. 6.

(SP30) The temporal recovery means 318 determines whether or not five seconds have elapsed since the last temporal recovery. The temporal recovery means 318 shifts to processing in step SP32 upon making an affirmative determination and ends the entire process upon making a negative determination.

(SP32) The temporal recovery means 318 acquires the current stamina S0 from the storage means 300. The temporal recovery means 318 then shifts to processing in step SP34.

(SP34) The temporal recovery means 318 determines whether or not the current stamina S0 is equal to or more than the recovery upper limit value Smax1 (for example, "100") (S0≥Smax1). The temporal recovery means 318 ends the entire process upon making an affirmative determination and shifts to processing in step SP36 upon making a negative determination.

(SP36) The temporal recovery means 318 allows for recovery from the current stamina S0 as time passes. Specifically, the temporal recovery means 318 adds a numeral value X (for example, "2") to the current stamina S0 (S0=S0+X). The temporal recovery means 318 then stores the stamina S0 resulting from the addition in the storage means 300 as the current stamina S0. Thus, the display means 316 reflects the result of the addition in the bar 228 for the current stamina depicted in FIG. 3. In this case, for example, when "2" or more is added to the current stamina S0, the current stamina S0 is prevented from exceeding the recovery upper limit value Smax1. For example, when the current stamina S0 is "99", the degree of the temporal recovery is 2, and the recovery upper limit value Smax1 is "100", the temporal recovery means 318 allows for recovery from the current stamina S0 to 100 stamina, and rounds down the remaining "1" of the temporal recovery. The temporal recovery means 318 then ends the entire process.

With reference back to FIG. 4, the credit recovery means 320 will be described The credit recovery means 320 includes the CPU 201, the main memory 202, and the game program. The credit recovery means 320 uses the credit to allow for recovery from the current stamina S0 resulting from the subtraction by the permission means 308, to an extent exceeding the recovery upper limit value Smax1 without using the recovery upper limit value Smax1 as an upper limit. Furthermore, the credit recovery means 320 preferably inhibits the use of the credit when the current stamina S0 exceeds the recovery upper limit value Smax1. Moreover, credit recovery means 320 more preferably allows for recovery from the current stamina S0 resulting from the subtraction by the permission means 308, by a value equal to or smaller than the difference between the maximum value of the stamina and the recovery upper limit value Smax1.

Figure 7:
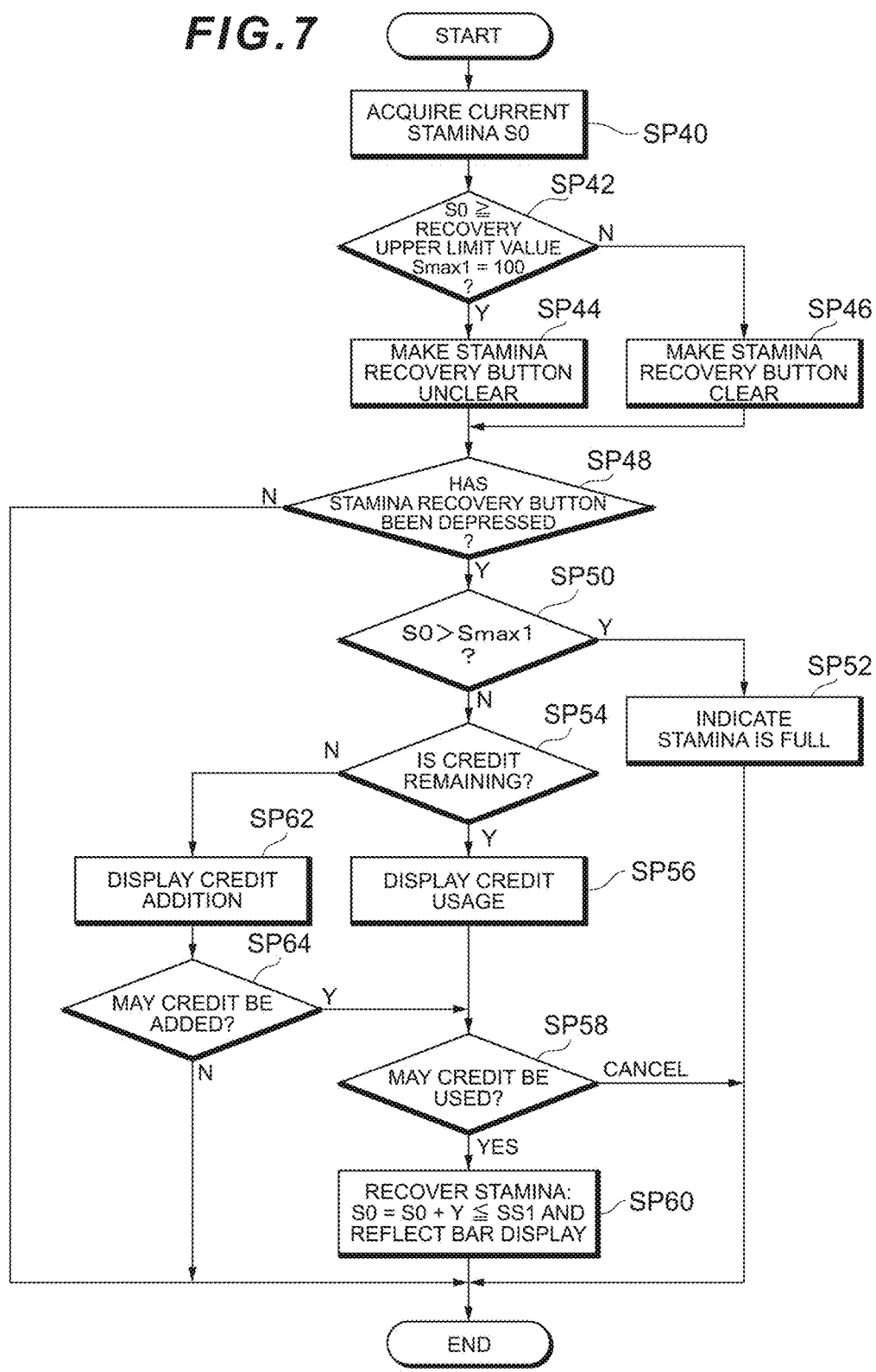
FIG. 7 is a flowchart depicting a flow of processing by credit recover means according to the first embodiment.

Specifically, the credit recovery means 320 executes such processing as depicted in FIG. 7. FIG. 7 is a flowchart depicting a flow of processing executed by the credit recovery means 320. The processing in the flowchart is repeated every second in the story selection screen 220 depicted in FIG. 3. Identification numerals in parentheses described below correspond to step identification numerals in FIG. 7.

(SP40) The credit recovery means 320 acquires the current stamina S0 from the storage means 300. Then, the credit recovery means 320 shifts to processing in step SP42.

(SP42) The credit recovery means 320 determines whether or not the current stamina S0 exceeds the recovery upper limit value Smax1 (S0>Smax1). The credit recovery means 320 shifts to processing in step SP44 upon making an affirmative determination and to step SP46 upon making a negative determination.

Figure 8:
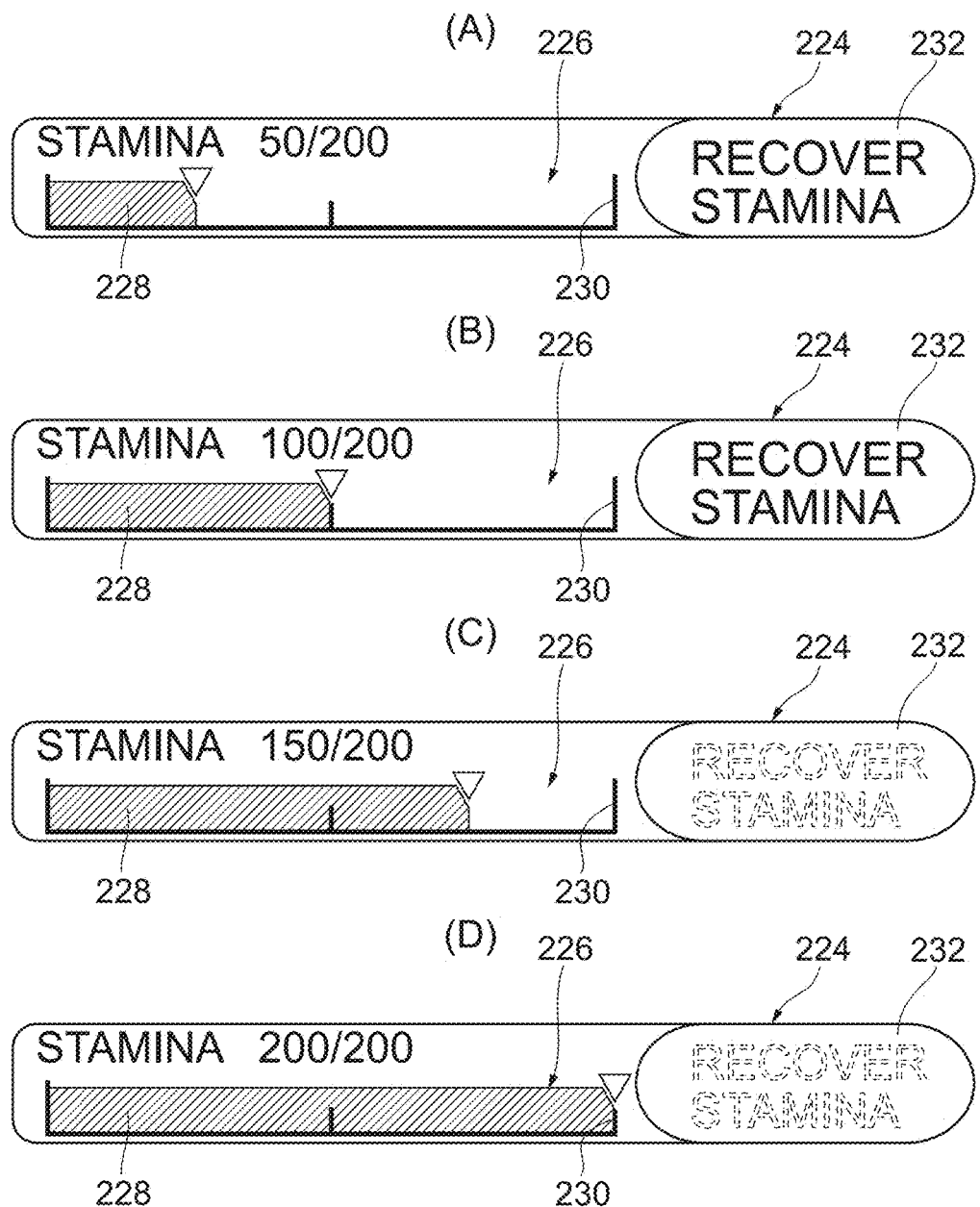
FIG. 8(A) is a first diagram illustrating a stamina display section.
FIG. 8(B) is a second diagram illustrating the stamina display section.
FIG. 8(C) is a third diagram illustrating the stamina display section.
FIG. 8(D) is a fourth diagram illustrating the stamina display section.

(SP44) The credit recovery means 320 allows the display means 316 to make the stamina recovery button 232 in the story selection screen 220 unclear as depicted in FIG. 8(C) and FIG. 8(D). "Making unclear" refers to, for example, darkening the background of the stamina recovery button 232, or thinning or deleting the characters in the stamina recovery button 232. The credit recovery means 320 then shifts to processing in step SP46.

(SP46) The credit recovery means 320 allows the display means 316 to make the stamina recovery button 232 in the story selection screen 220 clear s depicted in FIG. 8(A) and FIG. 8(B). "Making clear" refers to, for example, brightening the background of the stamina recovery button 232, or thickening the characters in the stamina recovery button 232. The credit recovery means 320 then shifts to processing in step SP48.

(SP48) The credit recovery means 320 determines whether or not the stamina recovery button 232 has been depressed. The credit recovery means 320 shifts to processing in step SP50 upon making an affirmative determination and ends the entire process upon making a negative determination.

(SP50) The credit recovery means 320 determines whether or not the current stamina S0 exceeds the recovery upper limit value Smax1 (S0>Smax1). The credit recovery means 320 shifts to processing in step SP52 upon making an affirmative determination and to step SP54 upon making a negative determination.

Figure 9:
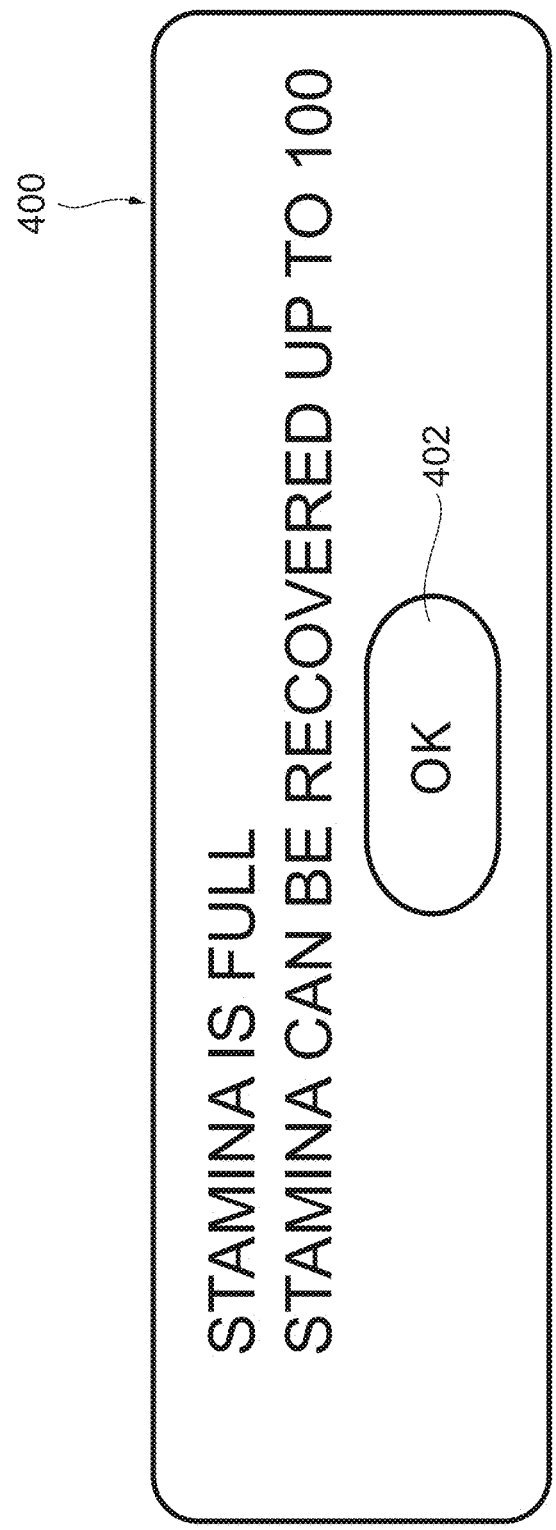
FIG. 9 is a diagram illustrating a first dialog box displayed by the credit recovery means according to the first embodiment.
Figure 10:
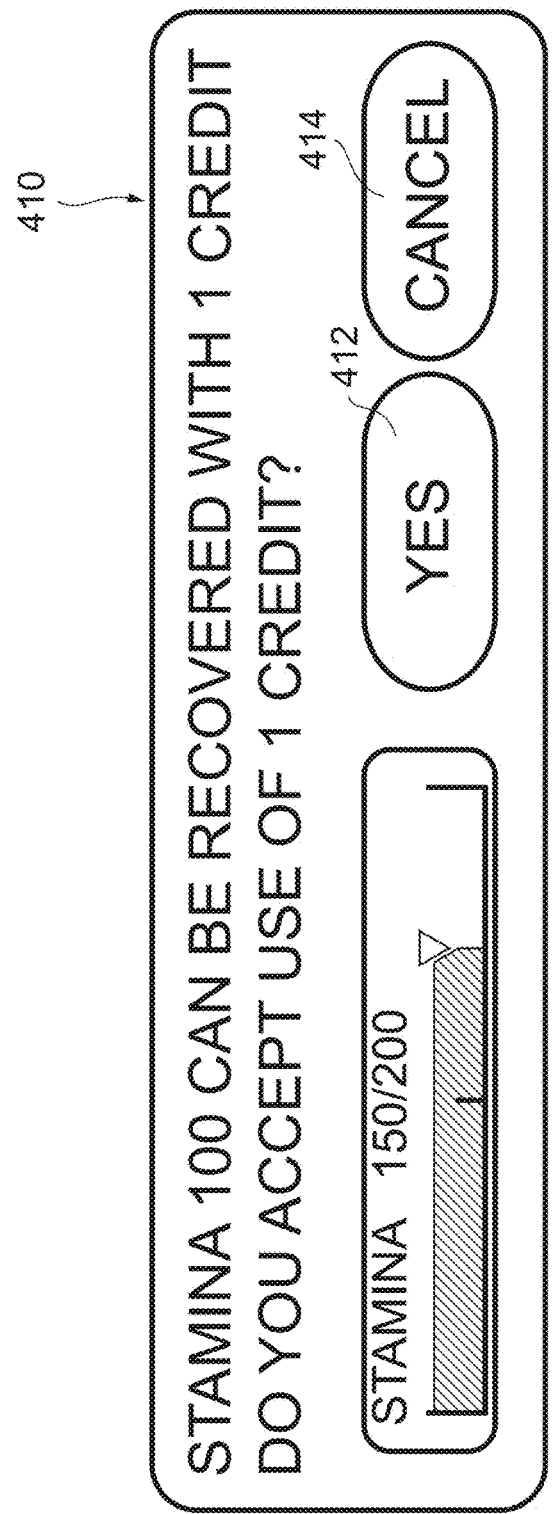
FIG. 10 is a diagram illustrating a second dialog box displayed by the credit recovery means according to the first embodiment.

(SP52) The credit recovery means 320 allows the display means 316 to display, for example, a dialog box 400 as depicted in FIG. 9, in the story selection screen 220. The dialog box 400 displays a description, for example, "Stamina is full. Stamina can be recovered up to 100", an OK button 402, and the like. The credit recovery means 320 ends the entire process in response to depression of the OK button 402. Thus, in this process, when the current stamina S0 exceeds the recovery upper limit value Smax1, the use of the credit, in other words, the recovery, is inhibited.

(SP54) The credit recovery means 320 acquires the current credit balance from the storage means 300. The credit recovery means 320 determines whether or not any credit remains, for example, a credit of at least "1" remains. The credit recovery means 320 shifts to processing in step SP56 upon making an affirmative determination and to step SP62 upon making a negative determination.

(SP56) The credit recovery means 320 allows the display means 316 to display, for example, a dialog box 410 as depicted in FIG. 9, in the story selection screen 220. The dialog box 410 displays a description, for example, "Stamina 100 can be recovered with 1 CREDIT! Do you accept the use of 1 CREDIT?", a "Yes" button 412, a "Cancel" button 414, and the like. The credit recovery means 320 then shifts to processing in step SP58.

(SP58) The credit recovery means 320 determines whether, in the dialog box 410, the "Yes" button 412 has been depressed or the "Cancel" button 414 has been depressed. The credit recovery means 320 shifts to processing in step SP60 when the "Yes" button 412 has been depressed and ends the entire process when the "Cancel" button 414 has been depressed.

(SP60) The credit recovery means 320 uses 1 credit from the credit balance to allow for recovery from the current stamina S0 resulting from the subtraction by the permission means 308. Specifically, the credit recovery means 320 adds a numerical value Y (for example, "100") to the current stamina S0 (S0=S0+Y). The numerical value Y is equal to or larger than the difference SS1 between the maximum value Smax2 of the stamina and the recovery upper limit value Smax1 (for example, "200"−"100"="100") (Y≤SS1). Furthermore, the recovery may exceed the recovery upper limit value Smax1 and is performed up to the maximum value Smax2 of the maximum stamina.

Then, the credit recovery means 320 stores the stamina S0 resulting from the addition in the storage means 300 as the current stamina S0. Thus, the display means 316 reflects the result of the addition in the bar 228 for the current stamina depicted in FIG. 3.

As described above, the credit recovery means 320 ends the entire process.

Figure 11:
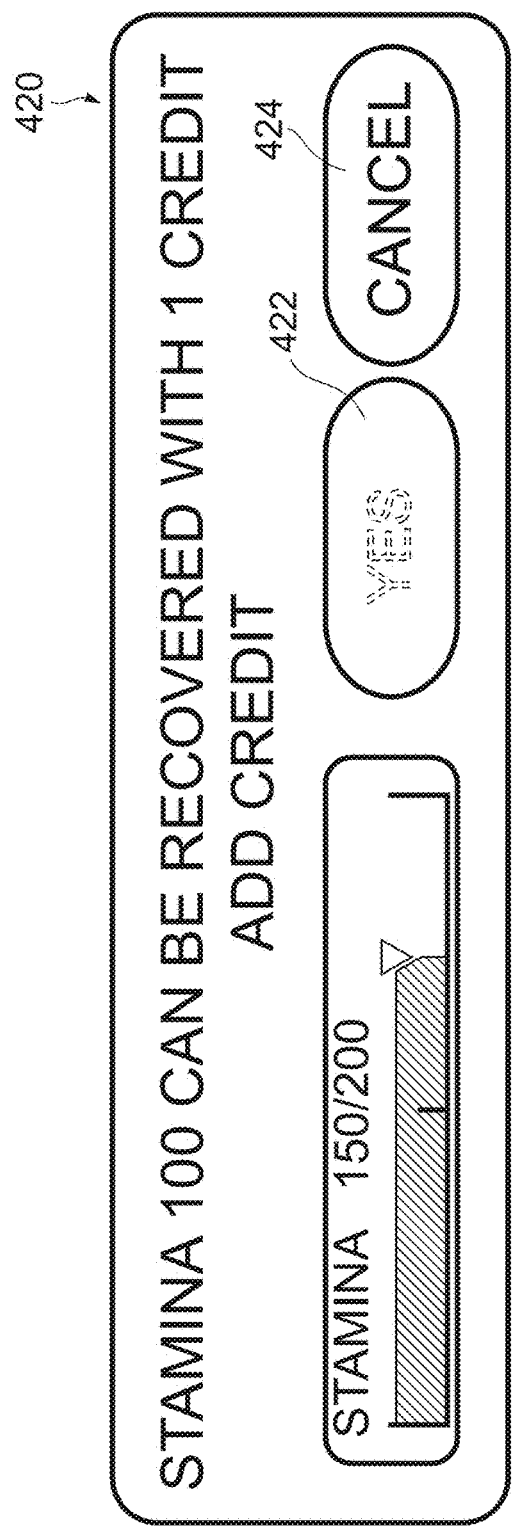
FIG. 11 is a diagram illustrating a third dialog box displayed by the credit recovery means according to the first embodiment.

(SP62) The credit recovery means 320 allows the display means 316 to display, for example, a dialog box 420 as depicted in FIG. 11 in the story selection screen 220. The dialog box 420 displays a description, for example, "Stamina 100 can be recovered with 1 CREDIT! Add CREDIT" a "Yes" button 422, a "Cancel" button 424, and the like. The credit recovery means 320 then shifts to processing in step SP64.

(SP64) The credit recovery means 320 determines whether, in the dialog box 420, the "Yes" button 422 has been depressed or the "Cancel" button 424 has been depressed. The credit recovery means 320 shifts to processing in step SP58 when the "Yes" button 422 has been depressed and ends the entire process when the "Cancel" button 424 has been depressed.

[Effects of the Gaming Device 100]

Now, the effects of the gaming device 100 will be described.

The gaming device 100 of the present embodiment has the temporal recovery means 318 that allows for recovery from the current stamina S0 resulting from the subtraction by the permission means 308, as time passes using the recovery upper limit value Smax1 as an upper limit. Furthermore, the gaming device 100 of the present embodiment is an arcade gaming device that adopts a business model referred to as free-to-play (F2P) and charging no price for basic plays, allowing the game to be played for free as long as the stamina remains. The gaming device 100 has the credit recovery means 320 that allows for recovery from the current stamina S0 resulting from the subtraction by the permission means 308, by using the credit obtained by the payment of coins even when the stamina exceeds the recovery upper limit value Smax1.

This configuration allows, for example, the stamina to be recovered by using the credit even when the stamina exceeds the recovery upper limit value Smax1 Thus, even when an odd amount of the stamina that is insufficient to perform a quest remains, the excess stamina is included in the stamina S0 resulting from the recovery, preventing the player from making a loss. Consequently, the player can use the credit at a desired timing regardless of the numeral value of the current stamina S0. Furthermore, the temporal recovery means 318 fails to perform the recovery when the stamina exceeds the recovery upper limit value Smax1, whereby the player may have a stronger sense of the use of the credit. Thus, the player actively uses the credit to enable suppression of a possible wait time for which the player waits for the stamina to recover during the game, allowing the tempo of the game to be improved. Additionally, the player can be restrained from going on a quest that the player does not desire to play during the wait time when the player waits for the stamina to recover during the game.

Furthermore, in the gaming device 100, when the stamina has the maximum value Smax2, the credit recovery means 320 inhibits the use of the credit when the current stamina S0 exceeds the recovery upper limit value Smax1.

If the credit recovery means 320 simply performs the recovery even when the recovery upper limit value Smax1 is exceeded, the following situation may occur. That is, although de pending on the degree of the recovery performed by the credit recovery means 320, when the current stamina S0 exceeds the recovery upper limit value Smax1 and recovery from the current stamina S0 is performed by using the credit, the current stamina S0 reaches the maximum value Smax2 before the recovery is complete. Thus, the stamina the player originally has is lost. Therefore, this preferred configuration inhibits the use of the credit when the current stamina S0 exceeds the recovery upper limit value Smax1. This prevents the current stamina S0 from reaching the maximum value Smax2 before the recovery is complete, allowing the stamina the player originally has to be prevented from being lost.

Furthermore, in the gaming device 100, the credit recovery means 320 allows for recovery from the current stamina S0 resulting from the subtraction by the permission means 308, by a value equal to or smaller than the difference SS1 between the maximum value Smax2 of the stamina and the recovery upper limit value Smax1.

If the credit recovery means 320 simply performs the recovery even when the recovery upper limit value Smax1 is exceeded, the following situation may occur. That is, if the degree Y of the recovery performed by the credit recovery means 320 is high, when a value resulting from subtraction of the current stamina S0 from the maximum value Smax2 is less than the degree Y of the recovery (Smax2−S0<Y) even though the current stamina S0 does not exceed the recovery upper limit value Smax1, the current stamina S0 reaches the maximum value Smax2 before the recovery is complete. Thus, a part (the difference−Y−(max2−S0) between the degree Y of the recovery and the value resulting from the subtraction Smax2−S0) of the stamina the player originally has is lost. Therefore, in this preferred configuration, the use of the credit allows for recovery from the current stamina S0 by the value Y equal to or smaller than the difference SS1 between the maximum value Smax2 of the stamina and the recovery upper limit value Smax1, whereby when the current stamina S0 does not exceed the recovery upper limit value Smax1, the value resulting from subtraction of the current stamina S0 from the maximum value Smax2 is prevented from being smaller than the degree Y of the recovery, and the recovery is positively achieved by the value resulting from subtraction of the current stamina S0 from the maximum value Smax2 before the maximum value Smax2 is reached. Therefore, a part of the stamina that the player originally has can be prevented from being lost.

Furthermore, in the gaming device 100, the display means 316 displays the background of the bar display in a color similar to the color of the bar 228 when the current stamina S0 exceeds the recovery upper limit value Smax1, and displays the background of the bar display in a color different from the color of the bar 228 when the current stamina S0 is equal to or smaller than the recovery upper limit value Smax1.

In this configuration, when the current stamina S0 exceeds the recovery upper limit value Smax1, the player is able to know that, for example, the use of the credit is inhibited because the background of the bar display is similar in color to the bar 228. Furthermore, when the current stamina S0 is equal to or smaller than the recovery upper limit value Smax1, the player is able to know that, for example, the use of the credit is allowed because the background of the bar display is different in color from the bar 228.

Additionally, in the gaming device 100, the display means 316 provides a display that urges the payment when the current stamina S0 is less than the consumed stamina S1 according to the quest. Thus, the display that urges the payment is presented to the player, allowing the player to volitionally pay while avoiding waiting for the temporal recovery.

In addition, in the present embodiment, the gaming device 100 is an arcade game apparatus. Thus, even when an odd amount of the stamina that is insufficient to execute a quest remains, the player actively pays. Thus, the arcade game apparatus is less frequently occupied during the wait time needed to achieve recovery from the odd amount of the stamina, allowing a possible decrease in game turnover ratio to be suppressed.

<Second Embodiment>

Now, a gaming device in a second embodiment of the present invention will be described using the drawings. The gaming device in the second embodiment is similar to the gaming device of the first embodiment except for the method for displaying stamina executed by the display means 316.

Figure 12:
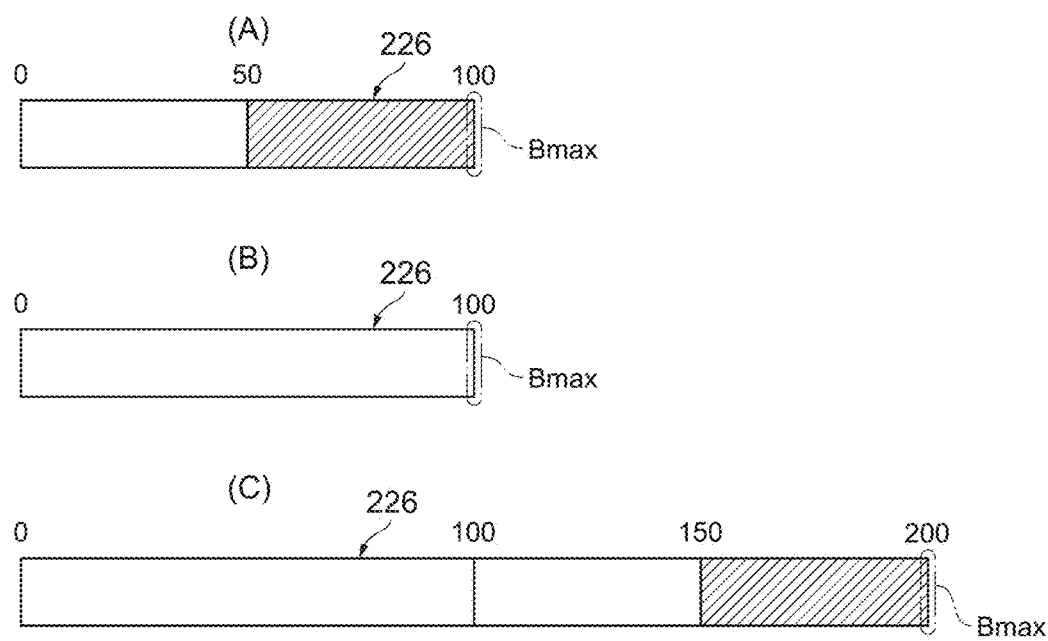
FIG. 12 is a diagram depicting a method for displaying stamina executed by display means according to a second embodiment.

FIG. 12 is a diagram depicting a method for displaying stamina executed by the display means 316 according to the second embodiment.

When the current stamina S0 is equal to or less than the recovery upper limit value Smax1, the display means 316 displays the maximum value Bmax in the bar display section 226 as a value indicated by the recovery upper limit value Smax1 (for example, "100") as depicted in FIG. 12(A) and FIG. 12(B).

Furthermore, when the current stamina S0 exceeds the recovery upper limit value Smax1, the display means 316 displays the maximum value Bmax in the bar display section 226 as a certain fixed value (for example, "200") as depicted in FIG. 12(C).

As described above, in the gaming device in the second embodiment, even if the current stamina S0 has not reached the maximum value Smax2, the bar 228 in the bar display is depicted so as to reach the maximum value Bmax in the bar display section 226 when the full stamina is recovered by means of the temporal recovery. Thus, the player apparently feels that full recovery from the current stamina S0 has been achieved. Consequently, the player may gain a sense of satisfaction based on the temporal recovery.

(Third Embodiment)

Now, a gaming device in a third embodiment of the present invention will be described using the drawings. The gaming device in the third embodiment is similar to the gaming device of the first embodiment except for the method for displaying stamina executed by the display means 316.

Figure 13:
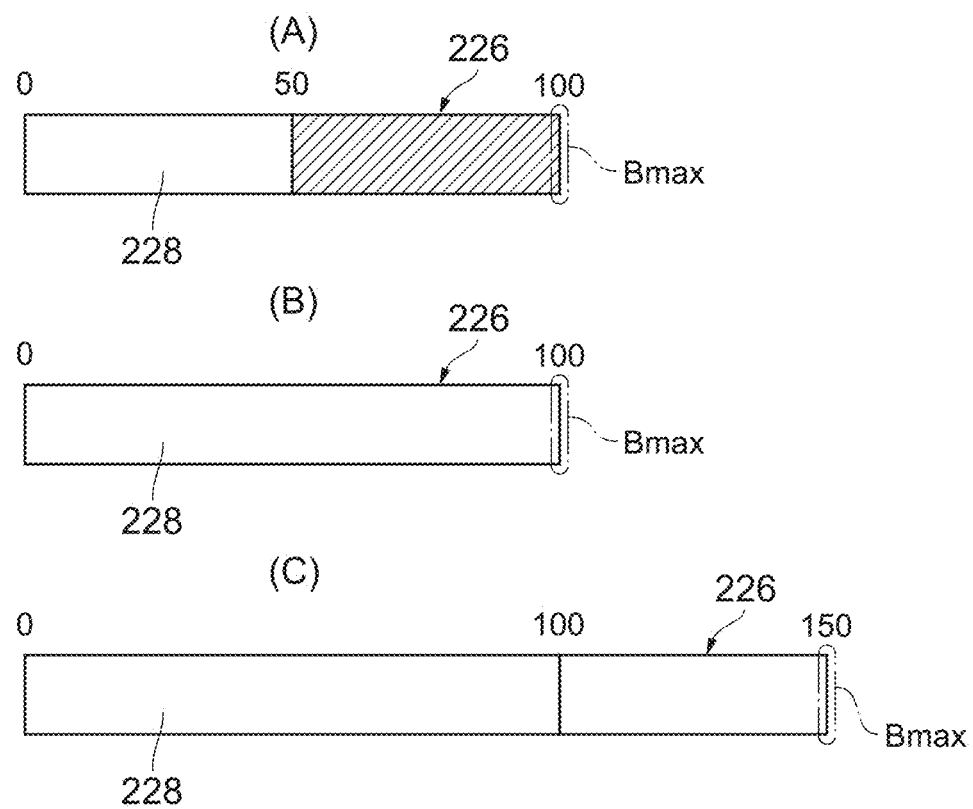
FIG. 13 is a diagram depicting a method for displaying stamina executed by display means according to a third embodiment.

FIG. 13 is a diagram depicting a method for displaying stamina executed by the display means 316 according to the third embodiment.

When the current stamina S0 is equal to or less than the recovery upper limit value Smax1, the display means 316 displays the maximum value Bmax in the bar display section 226 as a value indicated by the recovery upper limit value Smax1 (for example, "100") as depicted in FIG. 13(A) and FIG. 13(B).

Furthermore, when the current stamina S0 exceeds the recovery upper limit value Smax1, the display means 316 displays the maximum value Bmax in the bar display section 226 as a value indicated by the current stamina S0 as depicted in FIG. 13(C).

As described above, in the gaming device in the third embodiment, even if the current stamina S0 has not reached the maximum value Smax2, the bar 228 in the bar display is depicted so as to reach the maximum value Bmax in the bar display section 226 when the full stamina is recovered by means of the temporal recovery. Thus, the player apparently feels that full recovery from the current stamina S0 has been achieved. Consequently the player may gain a sense of satisfaction based on the temporal recovery.

Furthermore, in the gaming device in the third embodiment, recovery of the use of the credit allows the bar 228 in the bar display section 226 to be depicted so as to reach the maximum value Bmax in the bar display section 226 even if the current stamina S0 has not reached the maximum value Smax2. The player may thus apparently feel that the full recovery from the current stamina S0 has been achieved. Thus, the player may have a stronger sense of the use of the credit.

<Fourth Embodiment>

Now, a gaming device in a fourth embodiment of the present invention will be described using the drawings. The gaming device in the fourth embodiment is similar to the gaming device of the first embodiment except for the stamina recovery process by the credit recovery means 320.

When the difference between the maximum valueSmax2 of the stamina and the current stamina S0 is smaller than the degree Y of recovery performed by the credit recovery means 320 (Smax2−S0<Y), the credit recovery means 320 according to the fourth embodiment recovers the stamina by the value equivalent to the difference between the maximum valueSmax2 of the stamina and the current stamina S0 (S0=S0+(Smax2−S0)), and leaves the difference (Y−(Smax2−S0)) resulting from the subtraction, from the degree Y of the recovery, of the difference between the maximum value Smax2 and the current stamina S0, as credit or any other game item that allows for recovery by the value equivalent to the difference.

In the first embodiment, when the current stamina S0 exceeds the recovery upper limit value Smax1 the credit recovery means 320 inhibits the use of the credit and allows for recovery from the current stamina S0 resulting from the subtraction by the permission means 308, by the value Y equal to or smaller than the difference between the maximum value Smax2 of the stamina and the recovery upper limit value Smax1. In this case, the value resulting from the subtraction of the current stamina S0 from the maximum value Smax2 is considered to be equal to or larger than the degree Y of the recovery. However, even if such a configuration is not provided or even if the value resulting from the subtraction of the current stamina S0 from the maximum value Smax2 is smaller than the degree Y of the recovery even though the configuration of the first embodiment is provided, the configuration of the fourth embodiment allows a part of the stamina that the player originally has to be prevented from being lost because the difference resulting from the subtraction, from the degree of the recovery, of the difference between the maximum value Smax2 and the current stamina S0 is left as a game item that allows for recovery by the value equivalent to the difference.

<Fifth Embodiment>

Figure 14:
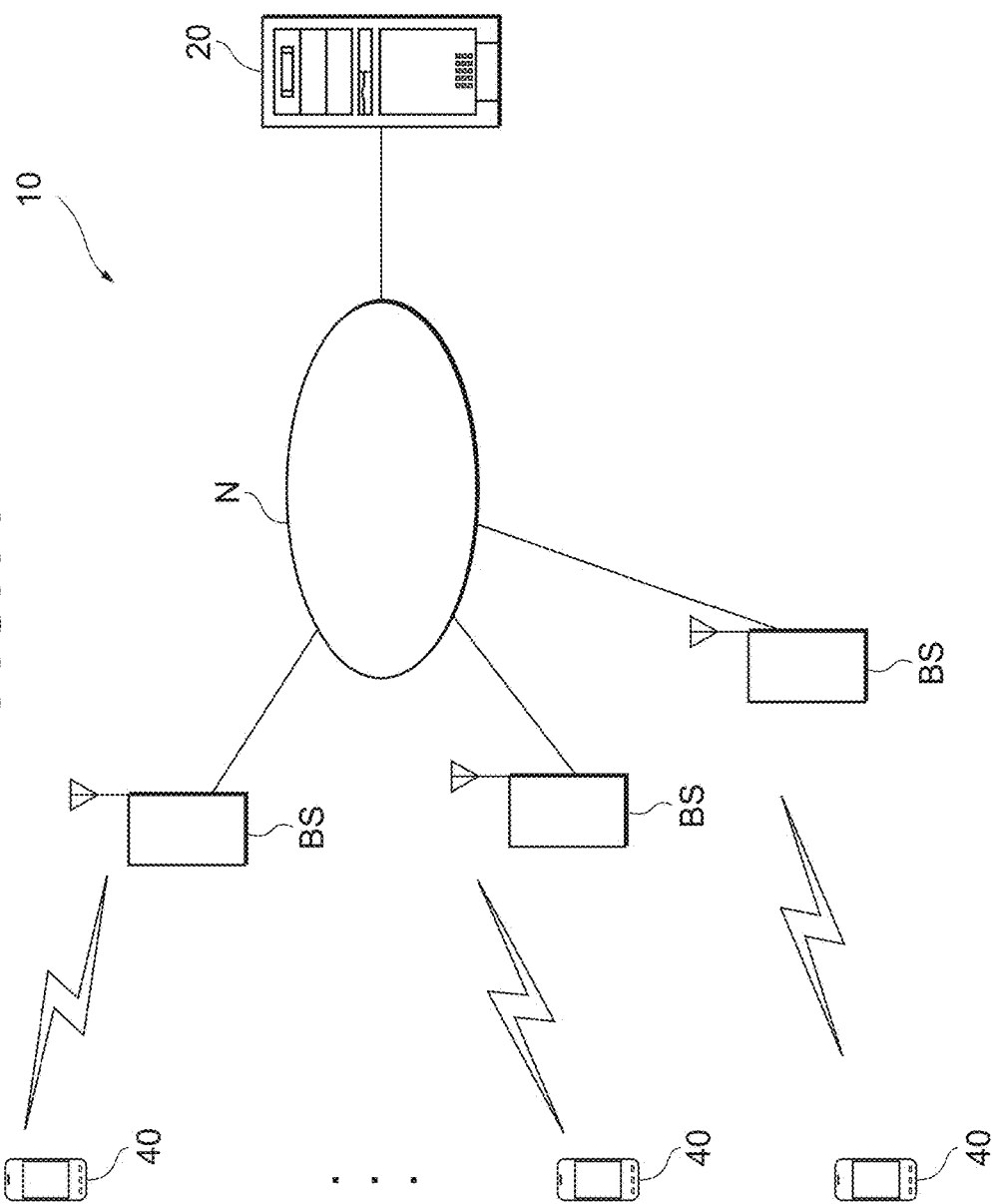
FIG. 14 is a configuration diagram depicting a configuration of a network gaming system as a system according to a fifth embodiment.

Now, a gaming device in a fifth embodiment of the present invention will be described using the drawings. FIG. 14 is a configuration diagram depicting a configuration of a network game system 10 as a system in the fifth embodiment.

The network game system 10 of the fifth embodiment has a game server 20 serving as a server apparatus, and a plurality of game terminals 40 serving as a gaming device. The game server 20 and each of the game terminals 40 can be connected together indirectly via a base station BS or directly by a network N such as a World Wide Web system provided on the Internet.

In the network game system 10, when the game terminal 40 is connected to the network N and to the game server 20, various network games can be provided online to the game terminal 40. In the network game system 10, play data corresponding to a plurality of types of game software (applications) are, for example, managed and provided to enable the player to enjoy various games like in a game arcade. The game software may be installed in the game terminal 40 or a game function may be provided online to the game terminal 40 by the game server 20. By way of example, in the present embodiment, a new puzzle role playing game is provided in which quests incorporating a dropping puzzle game in battles between the player at the game terminal 40 and enemies are cleared.

In the network game system 10 of the fifth embodiment, functions provided which are similar to the functions in the example of the functional configuration of the gaming device 100 described in the first embodiment. However, in the fifth embodiment, all or a part of the functional configuration depicted in FIG. 4 is provided in the game server 20 rather than in the game terminal 40.

As a method for paying, the fifth embodiment uses, instead of the method of using coins, for example, a method in which the game server 20 accumulates amounts to be paid by the player on a daily basis and in which the player pays the sum by cache or credit card on a monthly basis.

As described above, the system of the fifth embodiment allows the tempo of the game to be improved, as is the case with the first embodiment. Thus, since network games are often utilized to fill up the time, a situation can be suppressed in which opportunities for payment are missed as a result of the player shifting to another game during the wait time.

<Variation>

The plurality of embodiments of the technique disclosed by the present application has been described. However, the technique disclosed by the present application is not limited to the above-described technique.

For example, the credit recovery means 320 allows for recovery from the current stamina S0 by using the credit obtained by payment of coins. However, recovery from the current stamina S0 may be performed simultaneously with the payment of the coins. Namely, the credit recovery means 320 may perform the recovery using direct means, that is, the payment, instead of the indirect game item, that is, the credit.

Furthermore, the credit recovery means 320 uses the credit as described above, but may use any game item other than the credit, for example, a herb, a potion, or recovery magic.

Additionally, the content of the game program GP is not limited to the above-described new puzzle role playing game but may be, for example, a simple role playing game, a simple puzzle game, an action game, a fighting game, a shooting game, a gun game, a driving game, a quiz game, a mah-jong game, a medal game, or a music game.

In addition, the game action in the game is not limited to the execution of a quest described above but may be execution of a fighting game or a shooting game or the like. Moreover, the game may involve a plurality of types of game actions or a single type of game action and involve a plurality of types of consumed stamina or a single type of consumed stamina.

Furthermore, the object on which the permission means 308 performs subtraction is not limited to the execution acceptable value expressed in terms of "stamina" but may be any other execution acceptable value expressed in terms of physical strength or magical power, any other power, energy, credit, HP (hit points), or the like.

Additionally, the recovery upper limit value Smax1 and the maximum value Smax2 of the stamina are not limited to fixed values such as "100" and "200" but may be variable values according to the player's skill (level) or the situation of the game. For example, if the recovery based on the use of the credit is fixed at "100", the recovery upper limit value Smax1 of the stamina is "20" and the maximum value Smax2 of the stamina is "120" when the level is 1, and the recovery upper limit value Smax1 of the stamina is "100" and the maximum value Smax2 of the stamina is "200" when the level is 99. In addition, for example, the game item obtained by the payment may be used to add to the recovery upper limit value Smax1 of the stamina for a given period (for example, for one day from the start of use of the item). In that case, the same value as that added to the recovery upper limit value Smax1 is desirably added to the maximum value Smax2 of the stamina.

Moreover, the degree Y of the recovery based on the use of the credit is not limited to a fixed value such as "100" but may be a variable value according to the players skill (level). For example, the recovery upper limit value Smax1 of the stamina is "20", the maximum value Smax2 of the stamina is "40", and the degree of the recovery is "20" when the level is 1. The recovery upper limit value Smax1 of the stamina is "100", the maximum value Smax2 of the stamina is "200", and the degree Y of the recovery is "100" when the level is 99.

Furthermore, the case has been described where the stamina has the maximum value Smax2. However, the stamina may be infinite rather than having the maximum value Smax2.

<Feature>

<Feature 1>

When the difference between the maximum value of the execution acceptable value and the execution acceptable value is smaller than the degree of the recovery, the payment recovery means allows for recovery of the execution acceptable value to the degree of the recovery and leaves a difference resulting from subtraction, from the degree of the recovery, the difference between the maximum value and the execution acceptable value, as the game item that allows for recovery by the value equivalent to the difference.

GP Game program
10 Network game system (system)
100 Gaming device
103 Operation input apparatus (operation means)
105 Coin inserting apparatus (reception means)
226 Bar display section (bar display)
228 Bar
230 Frame (background)
300 Storage means
305 Game start means
306 Game execution means (execution means)
308 Permission means
316 Display means
318 Temporal recovery means
320 Credit recovery means (payment recovery means)
S0 Current stamina (execution acceptable value)
S1 Consumed stamina (consumption value)
Smax1 Recovery upper limit value
Smax2 Maximum value of stamina

I claim:

1. A gaming device comprising:
   an execution part that executes a game action in a game;
   a storage part that stores an execution acceptable value for the game action;
   a permission part that in order for the execution part to start to execute the game action, permits the execution by subtracting a consumption value according to the game action from the execution acceptable value;
   a temporal recovery part that allows for recovery of the execution acceptable value resulting from the subtraction by the permission part, as time passes using a recovery upper limit value as an upper limit; and
   a payment recovery part that allows for recovery of the execution acceptable value resulting from the subtraction by the permission part, based on payment or use of a game item obtained by the payment, even when the recovery upper limit value is exceeded.

2. The gaming device according to claim 1, wherein the storage part stores a maximum value of the execution acceptable value that is larger than the recovery upper limit value, and
   the payment recovery part inhibits the payment or the use when the execution acceptable value exceeds the recovery upper limit value.

3. The gaming device according to claim 2, wherein the payment recovery part allows for recovery of the execution acceptable value resulting from the subtraction by the permission part, by a value equal to or smaller than a difference between the maximum value and the recovery upper limit value.

4. The gaming device according to claim 1, further comprising a display part that represents the execution acceptable value with a bar, wherein
   the display part displays a background of the bar display in a color similar to a color of the bar when the execution acceptable value exceeds the recovery upper limit value, and displays the background of the bar display in a color different from the color of the bar when the execution acceptable value is equal to or smaller than the recovery upper limit value.

5. A program allowing a computer to execute:
   an execution step of executing a game action in a game;
   a permission step of, in order for the execution of the game action in the execution step to be started, permitting the execution by subtracting a consumption value according to the game action from an execution acceptable value for the game action;
a temporal recovery step of allowing for recovery of the execution acceptable value resulting from the subtraction in the permission step, as time passes using a recovery upper limit value as an upper limit; and
a payment recovery step of allowing for recovery of the execution acceptable value resulting from the subtraction in the permission step, based on payment or use of a game item obtained by the payment, even when the recovery upper limit value is exceeded.

6. A system comprising:
an execution part that executes a game action in a game;
a storage part that stores an execution acceptable value for the game action;
a permission part that in order for the execution part to start to execute the game action, permits the execution by subtracting a consumption value according to the game action from the execution acceptable value;
a temporal recovery part that allows for recovery of the execution acceptable value resulting from the subtraction by the permission part, as time passes using a recovery upper limit value as an upper limit; and
a payment recovery part that allows for recovery of the execution acceptable value resulting from the subtraction by the permission part, based on payment or use of a game item obtained by the payment, even when the recovery upper limit value is exceeded.

7. An arcade gaming device installed in a gaming facility, the arcade gaming device comprising:
an operation part that operates a game in accordance with a player's operation;
a reception part that receives payment;
a game start part that starts the game in accordance with operation of the operation part without the payment;
an execution part that executes a game action in the game in accordance with the operation of the operation part;
a storage part that stores an execution acceptable value for the game action;
a permission part that in order for the execution part to start to execute the game action, permits the execution by subtracting a consumption value according to the game action from the execution acceptable value without the payment when the execution acceptable value is equal to or larger than the consumption value;
a temporal recovery part that allows for recovery of the execution acceptable value, as time passes using a recovery upper limit value as an upper limit; and
a payment recovery part that allows for recovery of the execution acceptable value based on payment or use of a game item obtained by the payment, even when the recovery upper limit value is exceeded.

8. The program according to claim 5,
wherein the computer is one for managing a game system executed by a plurality of players,
wherein the execution step executes any one of a plurality of the game actions set in the game,
wherein the consumption values set in at least two game actions are different from each other, and
wherein the payment recovery step makes the execution acceptable value recover based on a recovery value which is set to correspond to each of the plurality of players.

9. The program according to claim 8, wherein the recovery value varies depending on a play level of a player corresponding to the recovery value.

10. The program according to claim 9, wherein the recovery upper limit value is the same as the recovery value.

* * * * *